(12) United States Patent
Kuno et al.

(10) Patent No.: US 11,852,292 B2
(45) Date of Patent: Dec. 26, 2023

(54) LUBRICANT DISPENSER

(71) Applicant: PERMA-TEC GMBH & CO. KG, Euerdorf (DE)

(72) Inventors: Buehner Kuno, Wildflecken (DE); Eisenbacher Egon, Karlstadt (DE)

(73) Assignee: PERMA-TEC GMBH & CO. KG, Euerdorf (DE)

( * ) Notice: Subject to any disclaimer, the term of this patent is extended or adjusted under 35 U.S.C. 154(b) by 290 days.

(21) Appl. No.: 17/419,410

(22) PCT Filed: Feb. 13, 2020

(86) PCT No.: PCT/EP2020/053770
§ 371 (c)(1),
(2) Date: Jul. 12, 2021

(87) PCT Pub. No.: WO2020/187501
PCT Pub. Date: Sep. 24, 2020

(65) Prior Publication Data
US 2021/0404601 A1 Dec. 30, 2021

(30) Foreign Application Priority Data
Mar. 15, 2019 (DE) .......................... 102019106681.6

(51) Int. Cl.
*F16N 11/08* (2006.01)
*F16N 7/38* (2006.01)
(Continued)

(52) U.S. Cl.
CPC ................ *F16N 11/08* (2013.01); *F16N 7/38* (2013.01); *F16N 13/06* (2013.01); *F16N 19/00* (2013.01); *F16N 2013/063* (2013.01)

(58) Field of Classification Search
CPC . F16N 11/08; F16N 7/38; F16N 13/06; F16N 19/00; F16N 2013/063
(Continued)

(56) References Cited

U.S. PATENT DOCUMENTS 3,912,045 A * 10/1975 Morris ..................... F16N 13/10
123/196 R
5,228,842 A * 7/1993 Guebeli ................ B05B 9/0413
277/530
(Continued)

FOREIGN PATENT DOCUMENTS

CH 630443 B 6/1982
DE 10004778 A 8/2001
(Continued)

*Primary Examiner* — Gene O Crawford
*Assistant Examiner* — Emily R Kincaid
(74) *Attorney, Agent, or Firm* — Andrew Wilford

(57) ABSTRACT

The invention relates to a lubricant dispenser comprising a storage container (1) filled with lubricant and a pump (2) which is connected to or can be connected to the storage container (1) and by means of which the lubricant can be pumped out of the storage container (1). The pump has a pump housing (3) with an inlet opening (4) and an outlet opening (5), a piston (6) which is movably guided in the pump housing (3) in a linear manner, and a drive (7) which acts on the piston (6). The pump housing (3) of the pump (2) is connected to or can be connected to the storage container (1), and the piston (6) can be raised or lowered cyclically by the drive (7) in order to pump a lubricant from the inlet opening (4) to the outlet opening (5). The lubricant dispenser is characterized in that the piston (6) is designed in a stepped manner with an upper piston surface (10) which delimits an upper displacement chamber (8) and a lower piston surface (11) which delimits a lower displacement chamber (9) and is reduced compared to the upper piston surface (10). The (Continued)

Figure 1A:
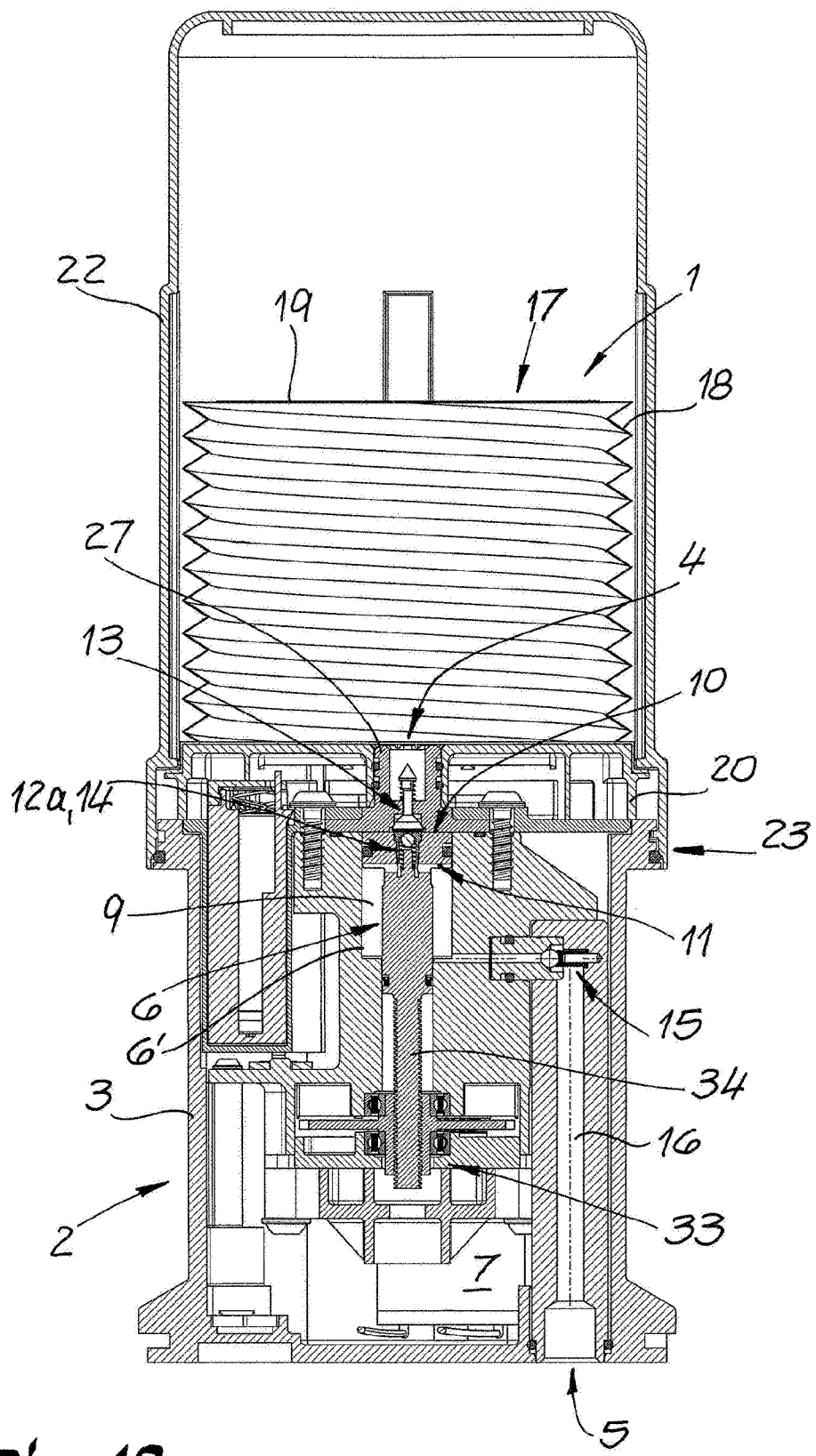

upper displacement chamber (8) adjoins the inlet opening (4) via a first valve (13), and the first valve (13) is loaded or can be loaded into a closed base position. A through-opening (12a, 12b) which connects the upper displacement chamber (8) to the lower displacement chamber (9) with the interposition of a second valve (14) is arranged in or on the piston (6), and the lower displacement chamber (9) transitions into the outlet opening (5) via an outlet channel (16). When the piston (6) is lowered as the result of a negative pressure in the upper displacement chamber (8), the first valve opens (for example against a spring force), and lubricant is suctioned out of the storage container into the upper displacement chamber (8), but the second valve (14) closes and lubricant is pushed out of the lower displacement chamber (9) into the outlet channel (16). When the piston (6) is raised, the first valve (13) closes, but the second valve (14) opens in the piston (6), and lubricant both flows from the upper displacement chamber (8) into the lower displacement chamber (9) and is pushed from the lower displacement chamber (9) into the outlet channel (16).

20 Claims, 11 Drawing Sheets

(51) Int. Cl.
*F16N 13/06* (2006.01)
*F16N 19/00* (2006.01)

(58) Field of Classification Search
USPC .......................................................... 184/26
See application file for complete search history.

(56) References Cited

U.S. PATENT DOCUMENTS

| | | | |
|---|---|---|---|
| 5,229,842 A | 7/1993 | Guebeli | |
| 5,538,071 A | 7/1996 | Johansson | |
| 6,354,816 B1 | 3/2002 | Yang | |
| 7,228,941 B2 * | 6/2007 | Weigand | F16N 11/08 |
| | | | 184/7.4 |
| 8,544,610 B2 * | 10/2013 | Paluncic | F16N 11/08 |
| | | | 184/26 |
| 9,140,245 B2 | 9/2015 | Nakai | |
| 9,243,618 B2 | 1/2016 | Ozeki | |
| 9,862,387 B2 | 1/2018 | Yoon | |
| 10,107,450 B2 | 10/2018 | Yang | |
| 10,502,366 B2 | 12/2019 | Lee | |
| 10,900,473 B2 * | 1/2021 | Schlenker | F16N 13/16 |

FOREIGN PATENT DOCUMENTS

| | | |
|---|---|---|
| DE | 10148455 A | 4/2003 |
| DE | 102008038580 A | 2/2010 |
| DE | 102012220297 A | 5/2014 |
| EP | 2128443 A | 5/2009 |
| JP | 63219993 B | 9/1988 |

* cited by examiner

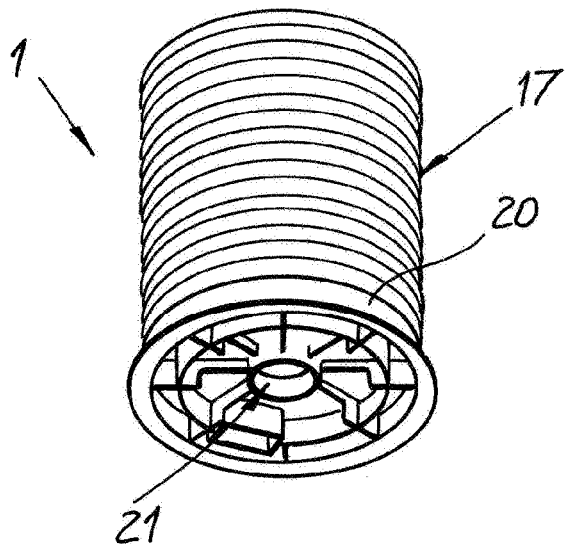
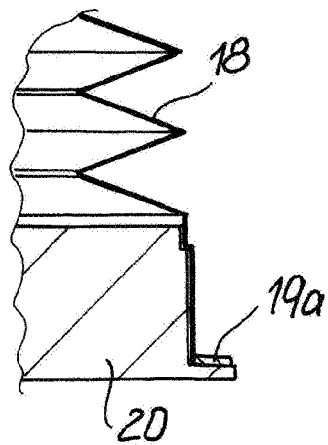
Fig. 3  Fig. 3A
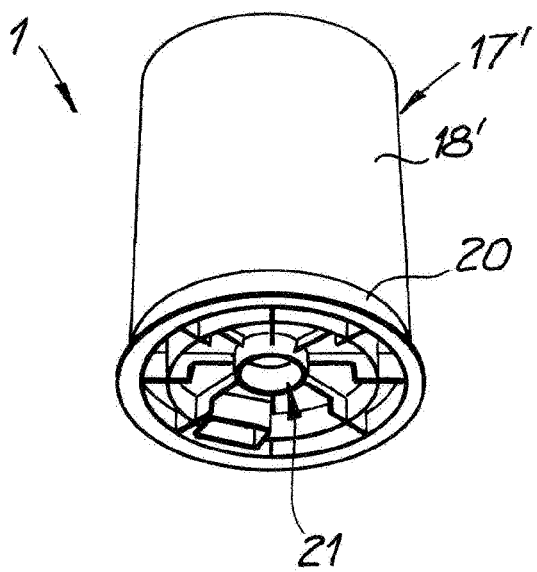
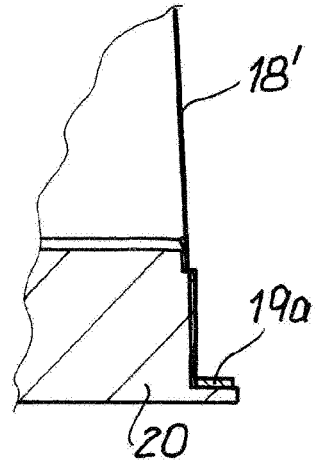
Fig. 4  Fig. 4A

LUBRICANT DISPENSER

CROSS REFERENCE TO RELATED APPLICATIONS

This application is the US-national stage of PCT application PCT/EP2020/053770 filed 13 Feb. 2020 and claiming the priority of German patent application 102019106681.6 itself filed 15 Mar. 2019.

The invention relates to a lubricant dispenser, comprising a reservoir filled with lubricant and a pump connected or connectable to the reservoir and that can move lubricant from the reservoir (to an outlet port or to a lubrication point connected to an outlet port), the pump having a pump housing with an (upper, first) inlet port and a (lower, second) outlet port, a piston movable axially in the pump housing, and a drive that operates on the piston. Therein the pump is or can be detachably connected to the reservoir by its pump housing, and the piston can be cyclically or periodically raised and lowered by the drive in a piston chamber (e.g. a cylinder chamber) of the pump housing in order to convey the lubricant from the inlet port to the outlet port.

Such lubricant dispensers are used for example for the automated lubrication of machine parts or plant parts, such as for example rolling and sliding bearings, linear guides, chains or the like. The lubricant dispensers are connected for example to a lubricating point (e.g. of a bearing) and can apply lubricants as a function of the running time of a machine or at predetermined intervals. Grease or oil for example are used as lubricant. The reservoir is also referred to as a cartridge, and such a cartridge can be detachably and interchangeably connected to the pump or the pump housing thereof to form a structural unit, for example by a screw connection, plug-in connection, detent, bayonet connection or the like. In order to convey the lubricant from the reservoir to the outlet port, a drive, preferably an electromotive drive, is cyclically raises and lowers the piston such that thus lubricant is sucked out of the reservoir and forced out of the outlet port. Such a lubricant dispenser can be designed in particular as a single-point lubricant dispenser in which the lubricant dispenser is connected to the outlet port directly or with the interposition of a hose line to the lubrication point. Alternatively, the lubricant dispenser is used as a multipoint lubricant dispenser in which a plurality of outlet ports are provided or a separate distribution device is connected to the outlet port to supply a plurality of lubrication points from a single lubricant dispenser at different locations via hose lines. Such single-point and multipoint lubrication systems are known from practice in a wide variety of embodiments.

A lubricant dispenser of the type described above is known for example from DE 102 34 881 [U.S. Pat. No. 7,228,941]. The reservoir is connected to a drive head in which rotation of a control surface is converted into a stroke movement by a cam having control surfaces and lubricant is thereby conveyed from the reservoir to a lubricant outlet at the shaft end. A piston connected to a threaded spindle is additionally inside the reservoir and displaces the lubricant out of the reservoir and feeds it to the lubricant passage of the drive shaft.

WO 2009/068135 [U.S. Pat. No. 8,544,610] discloses a lubricant dispenser having a reservoir and an outlet passage and having a pump element between the reservoir and the outlet passage for conveying lubricant, the pump element having a piston sealed in a cylinder and is displaceable between two positions such that, in an intake position of the cylinders, the cylinder is in fluid communication with the reservoir. The piston and the cylinder are adapted to one another such that, on movement of the piston into its suction position in the cylinder, a negative pressure relative to the pressure in the reservoir can be generated in order to suck or let in lubricant from the reservoir in the cylinder. During opposite movement of the piston from its suction position in the cylinder, an overpressure for conveying lubricant out of the cylinder into the outlet passage can be generated. A one-way valve is provided between the cylinder and the reservoir that is engaged by a closing position blocking a flow from the reservoir. In one embodiment of this lubricant dispenser, a spring applies a spring force to a pressure piston, so that pressure is applied to the lubricant in the reservoir. This is intended to improve discharge behavior of the lubricant from the reservoir, in particular in the case of highly viscous lubricants. Alternatively, a diaphragm in the reservoir separates a region filled with lubricant from an empty region. As a result of the air pressure, this diaphragm can be deformed so that the filled region becomes increasingly smaller with emptying.

DE 10004 778 describes a piston pump with constant pressure control for conveying liquids, specifically for delivering fuel. An opening to a reservoir is provided on the suction side and an opening provided on the pressure side is connected to a liquid distributor. A cylinder space in which a pump piston is guided so as to be movable back and forth via a drive is in a pump housing. Furthermore, a storage space is provided connected to the cylinder space via an overflow opening that can be closed by a control valve, and a piston biased by a spring is movable back and forth. During a suction stroke of the pump piston, liquid is conveyed from the storage chamber to the consumer.

The conveying of a medium from a container with the aid of a reciprocating piston is known in connection with color pumps, for example from DE 692 23 245 [U.S. Pat. No. 5,228,842].

DE 11 201 2 000 091 [U.S. Pat. No. 9,140,245] describes an electromagnetic pump intended for conveying a hydraulic fluid within a motor vehicle. The cylinder of this pump has a stepped inner diameter section and a piston slidable in the cylinder and formed with a stepped outer diameter. A discharge one-way valve with a spring-loaded valve ball is integrated into the piston. Furthermore, an inlet one-way valve is provided that also has a spring-loaded valve ball.

DE 2 336 282 [U.S. Pat. No. 3,912,045] describes a pump for liquids, in particular a lubricant pump, with which a lubricant is circulated, specifically in internal combustion engines, transmissions and the like.

DE 10 201 6 002 263 [U.S. Pat. No. 10,900,473] furthermore describes a pump for conveying a fluent medium, for example from a container formed as a barrel.

In addition, a double-acting piston pump is described in CH 630 443.

A pump element for a lubricant dispenser is also known from EP 2 128 443. A cylindrical pump chamber in which a piston is displaceable in a housing, and the pump chamber has an inlet port, an outlet port provided with a one-way valve, and at least one bypass opening. The bypass opening allows the piston to move back and forth in order to convey lubricant through the one-way valve into the outlet port between a first position that opens the inlet port and closes the bypass opening, and a second position closing the inlet port and the bypass opening and a pressure relief between the outlet port and the inlet port beyond the first position into a second position closing the inlet port so that, in the relief end position, the outlet port and the inlet port are in flow connection via a bypass duct that bypasses the one-way valve.

A device for the metered distribution of fluids at different points in connection with multi-point lubrication is described for example in DE 101 48 455.

DE 10 201 2 220 297 describes a lubricating device that comprises a piston pump that has a linearly movable piston movable in the bore of a cylinder element in order to convey a defined amount of lubricant from a lubricant supply to a lubricant outlet, and the piston is connected to a movement element with which it can be linearly connected. This movement element is a linear stepping motor that comprises a spindle-nut system.

Furthermore, EP 2 538 126 [U.S. Pat. No. 9,243,618] describes a lubricant dispenser with a reservoir and a pump in which a piston for conveying the lubricant is movable to and fro. The reservoir can be a bellows or be equipped with a bellows that contracts when emptying.

DE 10 201 6 101 727 [U.S. Pat. No. 9,862,387] also describes a lubricant dispenser with a lubricant cartridge. The background section states that the lubricant cartridge and the piston consist of a biodegradable plastic and are each produced as an injection-molded part.

DE 10 200 8 038 580 A1 discloses a foldable reservoir for a beverage supplier.

A further embodiment of a lubricant dispenser is known for example from EP 3 330 590 [U.S. Pat. No. 10,502,366]. Inside the reservoir is a piston lowered via a threaded rod to convey the medium, so that, in this embodiment, the lubricant is also forced via the piston in the pump.

In order to ensure reliable emptying of the reservoir and satisfactory delivery, in practice, in addition to the suction delivery via the pump, the lubricant is usually subjected to pressure, for example with the aid of a piston, specifically when viscous lubricants or greases are used and/or if the lubricant dispenser is to be operated at very low temperatures. One disadvantage of the known pumps of the lubricant dispensers is, on the one hand, the complex and complex construction and, on the other hand, the pump functions with only reduced conveying properties.

Proceeding from the previously known prior art and the described disadvantages, the object of the invention is to provide a lubricant dispenser of the type described above that is distinguished by simple construction and optimized conveying concept.

In order to achieve this object, the invention teaches in the generic lubricant dispenser of the type described above that the piston is stepped with a piston face delimiting an upper (first) compartment (bottom side) and a lower piston face that delimits a lower (second) compartment (top side) and is smaller in effective surface area than the upper piston face, and the upper compartment is connected to the inlet port via a first valve such that the first valve (for example, via spring force) is biased into a closed rest position, and a passage or piston opening is integrated or formed in or on the piston and connects the upper compartment to the lower compartment with the interposition of a second valve while the lower compartment is connected to the outlet port via an outlet passage, such that, when the piston is lowered (for example from its upper end position), the first valve (for example against spring force) is opened by the creation of negative pressure in the upper compartment and lubricant is sucked out of the reservoir into the upper compartment and, on the other hand, the second valve (in the piston) closes and lubricant is forced out of the lower compartment into the outlet passage whereas, when the piston is raised (from the lower end position or toward the upper end position), on the one hand, the first valve closes and, on the other hand, the second valve in the piston opens and lubricant flows out of the upper compartment into the lower compartment and thence from the lower compartment into the outlet passage.

The cylinder chamber or compartment formed by the piston chamber in which the piston of the piston pump is guided is consequently divided into an upper compartment and a lower compartment, specifically by the stepped piston according to the invention with piston faces of different dimensions. In combination with the first valve and in particular the second valve inside the piston or on the second valve, a double-acting, continuously conveying piston pump is used in a lubricant dispenser, so that the lubricant is conveyed during every piston movement, that is both during lifting and lowering of the piston. No idle stroke or filling stroke takes place to fill a chamber. With only one piston, a continuous or at least quasi-continuous delivery is realized, that is to say delivery without idle stroke, in which lubricant is conveyed with each piston movement. This is achieved with a structurally simple construction using a stepped piston with an integrated (second) valve, so that a minimum of parts is required. In addition, the system operates very economically, since the drive energy is used for each stroke for conveying medium without an idle stroke being interposed.

The drive for the piston of the pump is preferably an electromotive drive, preferably as a classical rotating drive, where rotation of the drive or the drive shaft is converted into a linear movement of the piston. For this purpose, the drive can preferably be connected to the piston via a gear mechanism that converts rotation of the drive into a linear movement or a stroke movement of the piston. Particularly preferably, the electric motor drive is reversible with respect to rotation direction, that is to say the direction of rotation of the drive is cyclically or periodically so that the reversing rotational movement of the drive is converted into a cyclical linear or stroke movement of the piston.

According to the invention, the statements like "top" and "bottom" or "raising" or "lowering" do not relate to absolute orientation in space, but rather to relative movement or relative orientation with respect to the reservoir, that is to say the reservoir is "above," so that the upward displacement is toward the reservoir and the downward displacement is away from the reservoir, and lifting is movement toward the reservoir and a lowering movement away from the reservoir.

According to the invention, the reservoir on the one hand and the pump on the other hand are not only functionally connected to one another (via a conduit), but they are also connected mechanically releasably to a separable structural unit, for example via a screw connection, a latching connection, a bayonet joint or another type of positive connection. During connection of the pump housing to the reservoir, a functional connection of the (upper) inlet port of the pump housing to the (lower) connection opening of the reservoir is also effected.

The upper and the lower piston face are preferably matched to one another in such a way that, when the piston is raised, on the one hand, and during the lowering of the piston, on the other hand, the same volume flow is always conveyed out of the lower compression chamber into the outlet passage.

As already described, the upper compartment is connected to the inlet port via the first valve that is preferably a one-way valve closed in the rest position and is preferably biased into this closed rest position, specifically preferably by a spring force. This means that when the piston is lowered by creating a negative pressure in the upper compartment, this first valve opens, preferably against the spring force. This can be realized in a structurally different manner. Thus for example the first valve can have a movable valve element and a separate valve spring acting on this valve element, specifically preferably into the closed rest position. Alternatively, the first valve that forms an intake valve, can have in a very simple embodiment a resilient valve element or be a resilient valve element. The spring action is consequently generated by the valve element that can be for example as a simply constructed spring plate. In order to get a satisfactory sealing effect, such a spring element can for example be a resilient sheet with an elastomeric sealing surface that, in the closed position, is forced against a (hard) counter-surface. Alternatively, however, it is also possible to use only a resilient, hard metal sheet without an elastomeric sealing surface, such a resilient, hard metal sheet being forced in a sealing manner against an elastomeric counter-surface in the closed position. In a further simplified embodiment, a one-way valve can also be used without a spring or resilient element, whereby for example a valve element (for example a valve ball or the like) is forced by the action of the medium into a valve seat and is consequently actuated in a closed position. When a negative pressure is produced in the upper compartment, such a valve element can be moved into the open position by its own weight.

The passage, already mentioned in connection with the second valve that is in or on the piston, for example in an upper piston part, can be designed for example as an opening within the piston or of the piston part, for example as a central passage or bore in which the second valve is provided, this second valve having for example a movably guided valve element actuated by a valve spring. To this extent, a one-way valve can be in a throughgoing bore inside the piston or piston part. In an alternative embodiment, the passage can be formed by an annular space surrounding the piston or its upper piston part, which annular space is formed by appropriate dimensioning for example between the piston or upper piston part and the wall of the piston chamber or cylinder space. In such an embodiment, the medium consequently does not flow through the piston when being conveyed, but rather flows externally past the piston (through an annular space). In this case, the function of the second valve is taken over for example by a correspondingly designed seal that surrounds the piston on the outside circumference and that for example acts as a resilient seal, for example a V-seal in which the lubricant can flow past in one direction but is blocked in the opposite direction.

In a particularly preferred embodiment and in particular for forming a minimally small dead space, the piston travels with its upper piston face into the upper end position (with reduction of a dead space volume) directly against the first valve, for example against a (spring-loaded) movable valve element, for example a valve plate, to push it into its closed position. Preferably, the first valve has a spring-loaded or resilient movable valve element, for example is a valve plate that in the closed position terminates flush with an inner, upper stop wall of the housing of the pump or with an inner, upper stop surface of the cylinder for the piston. In this upper end position, the piston moves with its upper piston face directly against this stop surface and the valve element flush within the stop surface, so that no dead space remains and dead space volume is reduced to a minimum. In this way, a self-priming pump is realized by means of which the lubricant is properly sucked out of the reservoir without the reservoir or lubricant having to be biased by an additional force or prestress (for example by a spring). According to the invention, it is possible, in particular, to dispense with an additional spring loading of the cartridge and nevertheless to achieve satisfactory emptying via the optimized pump action even in the case of low-flow media and/or at low temperatures. By dispensing with a spring element, it is possible for example to prevent separation of the grease that can occur in the prior art. In addition, it is possible to dispense with a piston within the reservoir and consequently also on a master spindle or guide of such a piston, so that built-in reservoir containers or cartridges can be used in a particularly simple manner and a complex coupling of a piston or spindle within the reservoir with the drive can also be dispensed with. Overall, the self-priming pump with minimal dead volume permits satisfactory delivery of even viscous media with a structurally very simple construction of the pump on the one hand and the reservoir on the other hand. Even if it is particularly preferred to dispense with such an additional actuation, the continuously operating pump, optionally also with an additional spring, works well for example at extremely low temperatures and/or with lubricants with a particularly high viscosity and consequently extremely poor flow behavior.

To this extent, although the lubricant is particularly preferably conveyed exclusively by suction through the pump without additional application of pressure (by spring, piston or the like) from the reservoir, that is, an exclusively self-priming system is realized. However, the invention optionally also discloses an embodiment with additional application of force, for example with an additional spring, in the manner described.

In a preferred embodiment that is self-explanatory, the reservoir is a container that collapses when emptying (self-contained), or the reservoir has such a collapsing liner. This means that, when emptying the container, it collapses automatically as a result of the negative pressure generated within the container and the container base is sucked toward the pump. A reservoir with significantly reduced waste is thus made available. This is because the waste product does not leave a container with the original container volume, but only the collapsed container with a significantly reduced waste volume, so that disposal is simplified. In addition to the collapsing reservoir, a rigid, non-collapsible protective cap is particularly preferably provided, so that the filled reservoir is inside this protective cap when installed. Particularly preferably, the reservoir can be fixed to the pump or the pump housing with the aid of this protective cap. In this case, the protective cap itself can be used again, while the reservoir can be replaced as a collapsible liner and consequently forms a disposable product with minimum residual volume.

In a first embodiment, the reservoir (or its liner) is a bellows with an accordion-like casing. Such reservoirs as bellows are fundamentally known in connection with lubricant dispensers. According to the invention, they are realized in the case of the continuously conveying pump described and particularly preferably in the case of a self-priming pump without additional spring loading.

In a second embodiment, the reservoir (or its liner) is formed as a collapsing cup with a thin-walled, flexible cylindrical casing, as is known for example in conventional disposable drinking cups. When emptying, the container or the cup bottom is sucked toward the pump and, in the process, the thin-walled cup casing folds together, so that, as in the case of a bellows, a waste product with a minimum residual volume remains. In contrast to a solution with bellows, the solution with collapsing container also has the advantage that optimum residual emptying can take place, since no residual amounts can remain within the folds of a bellows.

As already described, according to the invention, the double-acting piston with an upper piston face and a lower piston face is guided linearly within the pump housing or within a cylinder chamber or compartment realized in the pump housing. In principle, it is possible for the piston to rotate within the cylinder space or displacement space when being lifted, so that rotation of the motor is converted into lifting via a thread guide of the piston within the cylinder. In a preferred embodiment, however, the piston is non-rotatably and consequently non-rotatably guided within the pump housing or within the cylinder chamber. In this case, rotation of the motor (e.g. an electric motor) can be implemented for example via a threaded drive, in which a spindle or threaded rod is rotated. Such a threaded drive can for example have a wheel designed with an internal screwthread for a threaded rod or spindle guided therein, and the spindle is rotationally fixed to the piston. The threaded drive is rotated via the motor and, this rotation raises or lowers the threaded rod guided therein and thus raises or lowers the piston.

The piston is realized in the form of a stepped piston and consequently is T-shaped. It has a first (upper) piston part and a second (lower) piston part connected below the first piston part, and the upper side of the first piston part forms the upper piston face and the lower side of the first piston part forms the annular lower piston face. The lower compartment can be annular. In principle, the upper compartment can be cylindrical. In a preferred variant, however, the upper compartment is not cylindrical, that is to say it does not have a circular cross-section, but rather has a cross-section that deviates from circular, for example an oval cross-section. Thus, the first, upper piston part and thus also the upper piston face also have such a shape. This design (without further measure), rotationally fixes the piston within the housing/cylinder, that is to say without additional anti-rotation devices having to be implemented. However, the lower, second piston part can optionally have a circular cross-section.

The first valve and/or the second valve is/are one-way valves and particularly preferably spring-loaded one-way valves whose closing element is closed in one direction by a spring and is released in the other direction by the pressure of the medium. Embodiments are also described in which the closing element on the one hand and the spring on the other hand are combined with one another to form a single component, for example by a self-closing element that for example can be formed by a resilient sheet metal or the like. This applies in particular to the first valve. In the second valve, a valve-forming seal, for example a V-section seal ring, can be used for example in the manner described.

In principle, the invention can be realized very simply with only the two described valves, namely the first valve and the second valve. In an advantageous development of the invention, however, a third valve can additionally be provided, to be precise in or at the outlet port or in the outlet passage, this third valve being biased by spring force toward the lower compartment, i.e. counter to the conveying direction into its open position.

In principle, the lubricant dispenser according to the invention is distinguished by a perfect function with the first valve and the second valve and the minimum dead space volume, so that even air inclusions in the reservoir or air trapped when installing of the cartridge onto the pump do not lead to malfunctions. Such air inclusions lead to malfunctions in known embodiments that only produce a very low pressure, since without the corresponding generation of pressure, the pump action is disturbed and only the enclosed air is compressed or expanded. There is thus insufficient negative pressure and as a result, the lubricant is not moved. As a result of the minimized dead space volume according to the invention, a sufficiently high pressure is built up very quickly in the embodiment according to the invention and thus the optionally enclosed air is moved along and lubricant delivery is not disturbed. The optionally provided third valve, ensures that, if appropriate, enclosed air is conveyed very much faster through the pump. The pressure required to suck in the medium builds up much more quickly. Manual venting, as is required in known pumps, does not take place, that is to say the pump itself is self-venting. The air conveyed out of the system through the third valve subsequently does not interfere with the generation of the pump vacuum. Moreover, it is important that a hose, which leads to the lubrication point, is generally connected to the outlet of the pump. Such a hose line can be very long and this line or the lubrication point can become clogged for different reasons. Long lines are partially interrupted and a tee is mounted with a grease connection between them. As soon as a fitter starts up a grease press at this connection, it can free the line to the left and right of the T-piece without problems at a pressure of for example 200 bar. The optionally provided third valve prevents this high pressure from entering the pump from the outside. The third valve consequently protects the mechanical components in the interior of the lubricant dispenser.

It is within the scope of the invention that the motor is controlled in such a way that the piston travels from the upper end stop to the lower end stop and thus there is maximum delivery quantity. Optionally, however, the amount of dispensing can be adjusted in a flexible and infinitely variable manner, specifically without constructive adaptation, but solely by appropriate control of the drive, in that the drive is operated for more or less time and thus the stroke is limited. The consequently, the amount of dispensing can be adapted electronically in an infinitely variable manner without mechanical device conversion in situ, specifically exclusively by suitable control electronics for the motor. The intake volume can be dimensioned comparatively high by large dimensioning of the compartment. In this way, a pump with very good suction capacity can be made in conjunction with minimum dead space.

In principle, the difference in diameter or the difference in area on the piston can be designed in such a way that the piston always delivers an identical volume flow into the outlet independently of the direction of movement. Alternatively, however, the difference in diameter can also be selected in such a way that during an intake stroke only a very small quantity of lubricant is pushed into the outlet and then only short movements in each case toward the cleaning valve for the further displacement processes take place.

The invention also relates to a pump of the type described for a lubricant dispenser. The pump forms a separate structural unit assembled with the reservoir to form a lubricant dispenser. The pump according to the invention is consequently also self-contained under protection.

In addition, the invention also relates to a reservoir for such a lubricant dispenser, that is to say the reservoir is also protected, preferably in the embodiment as a collapsible beaker with a collapsible beaker casing.

In summary, the invention is based, inter alia, on the following considerations, and in particular the difficulties outlined below are overcome in the prior art.

On the one hand, in particular in the case of single-point lubricant dispensers, there is the challenge or need to realize small required dispensing amounts per pump stroke. As a rule, such devices are intended to press only very small amounts of lubricant (e.g. grease) per dispensing action into the respective lubrication point, so that there are no excessive pressure peaks there (such as for example with hand grease presses during manual re-lubricating). Therefore, the pump chambers of such devices are usually correspondingly small in size. In order to feed the necessary quantities of lubricant to the lubrication point as precisely as possible in the sum to many lubrication points, the value is therefore set so that these quantities are precisely maintained so that no overlubrication or underlubrication takes place over a longer period of time. The smaller the stroke volume of a pump, the more disturbing are, however, even the smallest dead volumes, since they impede the generation of negative pressure during suction and thus reduce the ability to suck in lubricating grease at low temperatures. As a result, in the prior art, there is the problem that the filling of the suction chamber is impeded even in the case of very small air inclusions, specifically in the case of viscous media. In order to counteract this, in the prior art, additional pre-pressure or pre-delivery elements (such as springs on reservoirs, etc.) are usually used. This can in turn lead to the lubricating grease in the reservoir being held permanently under more or less starting pressure that tends to bleed off. Alternatively, systems without a spring are therefore also used with forcibly guided pre-delivery pistons.

On the other hand, in practice, there is a desire for flexibility with respect to the delivery quantity, that is to say the desire to be able to adapt the delivery quantity per end user after a respective demand of the individual user. Therefore, the delivery volumes of the pump elements are also preferably kept very small in order to be able to supply somewhat larger dispensing quantities in direct succession by a plurality of dispensing strokes. Nevertheless, it is impossible in the prior art to be able to set the dispensing quantities as desired, since a multiple of an individual dispensing end must always be accepted.

These disadvantages are overcome overall by the concept according to the invention in that, on the one hand, a large intake volume is provided for the pump and, on the other hand, a small delivery volume is nevertheless provided. In addition, with appropriate control in conjunction with the quasi-continuous delivery, an arbitrarily adjustable delivery quantity per dispensing request can be attained even during the intake stroke.

The invention will be described below with reference to drawings showing embodiments.

Figure 1B:
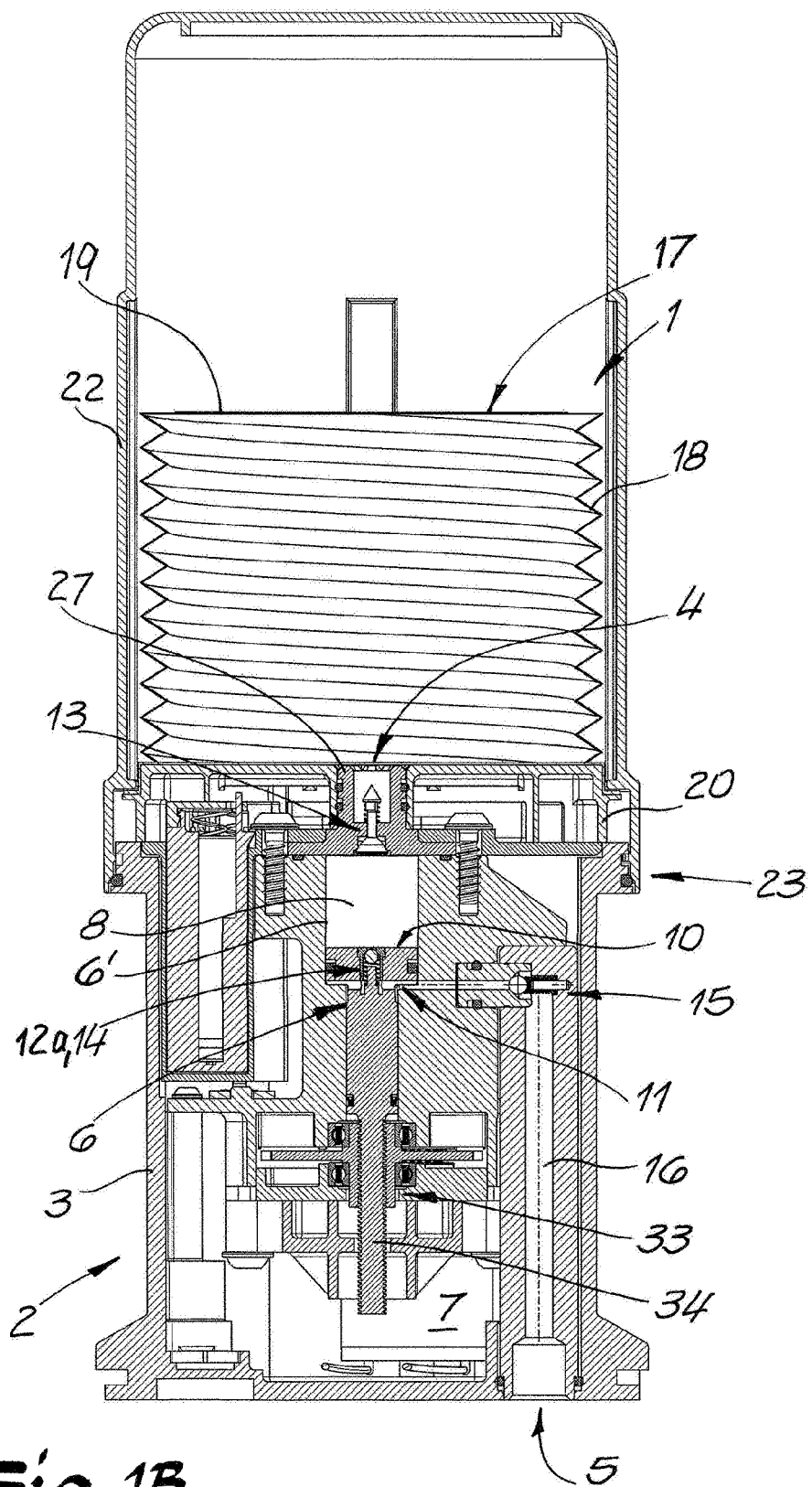
Figure 2A:
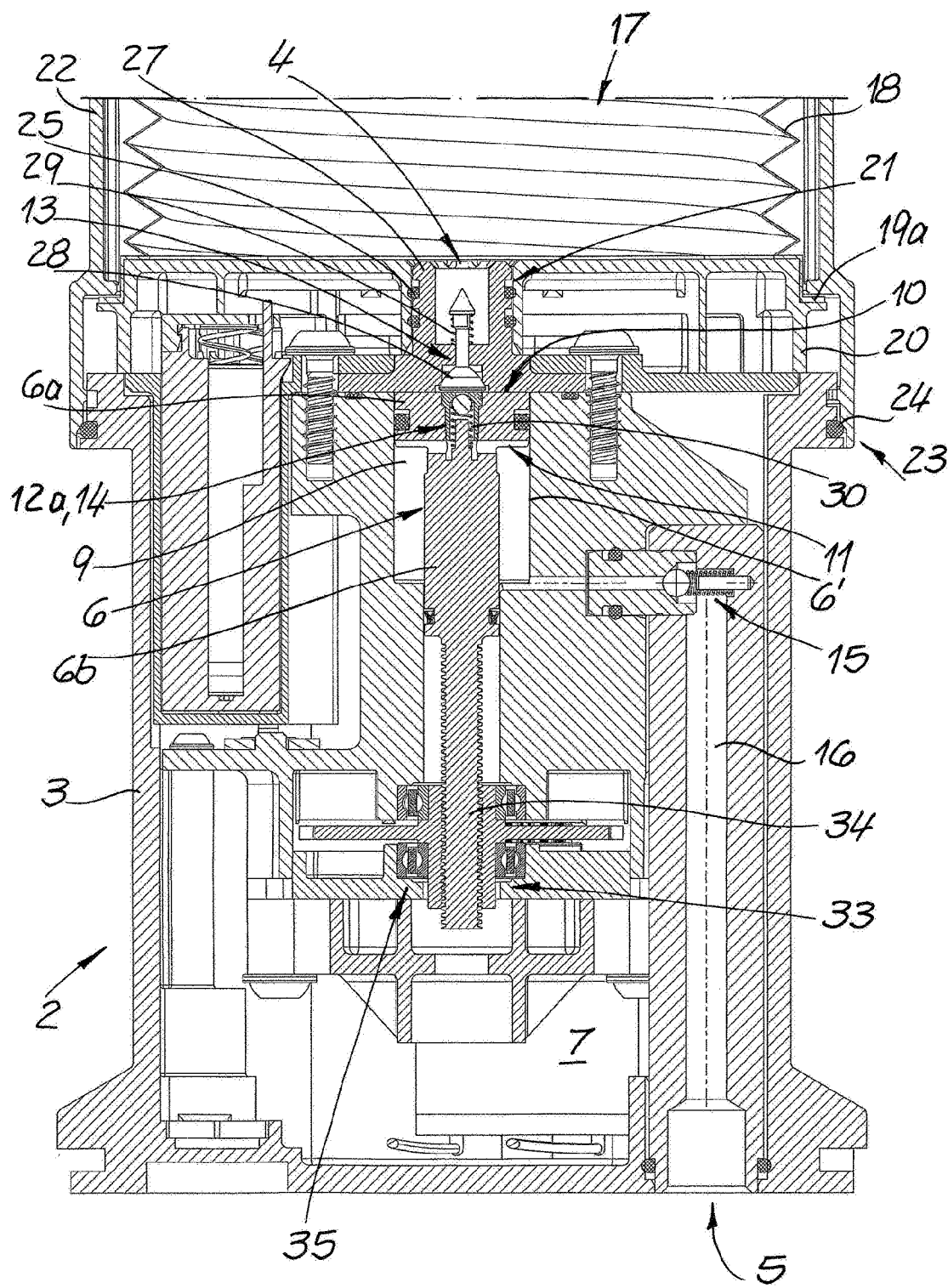
Figure 2B:
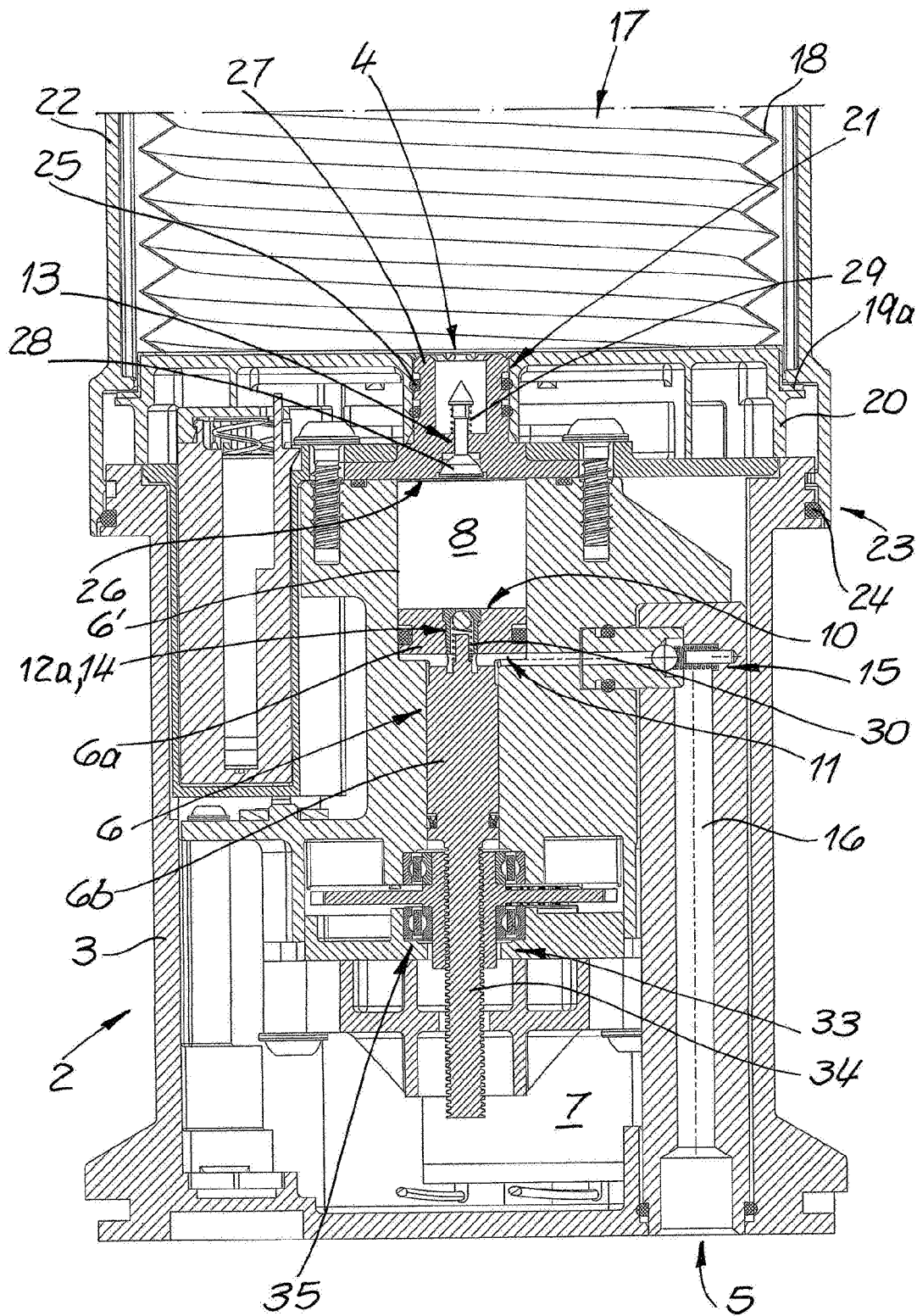
Figure 2C:
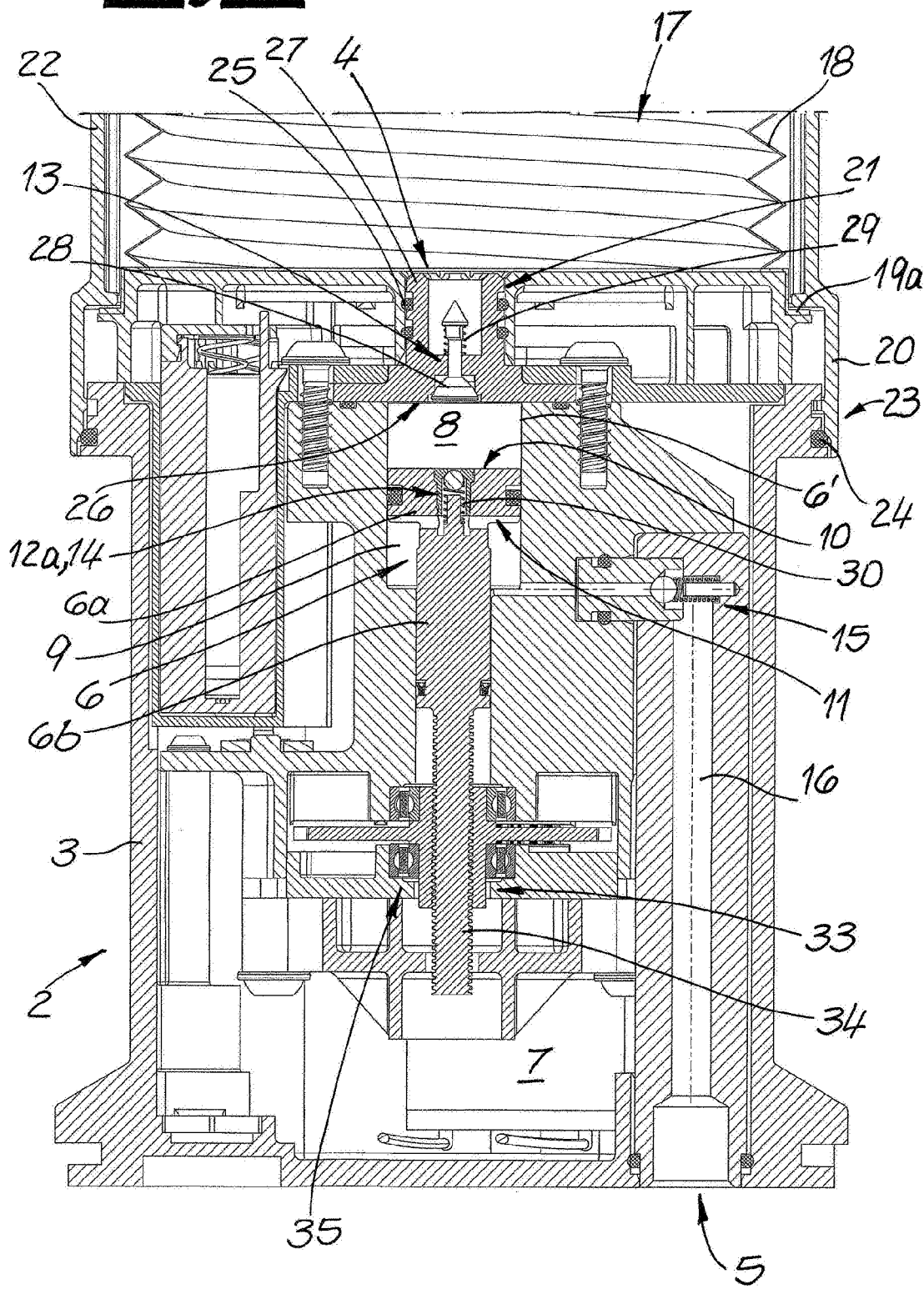
Figure 5:
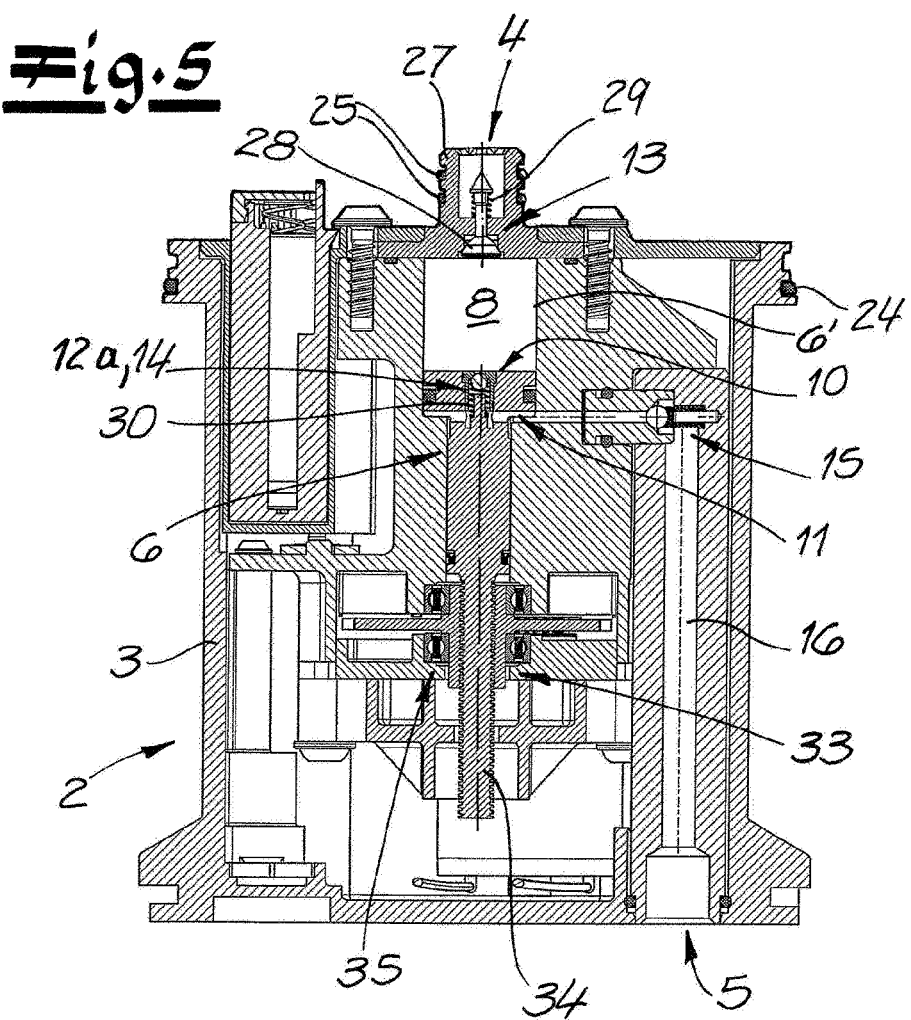
Figure 6:
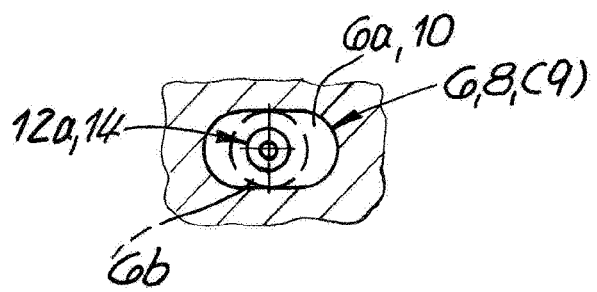
Figure 7:
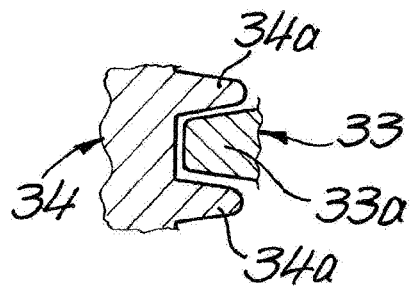
Figure 8:
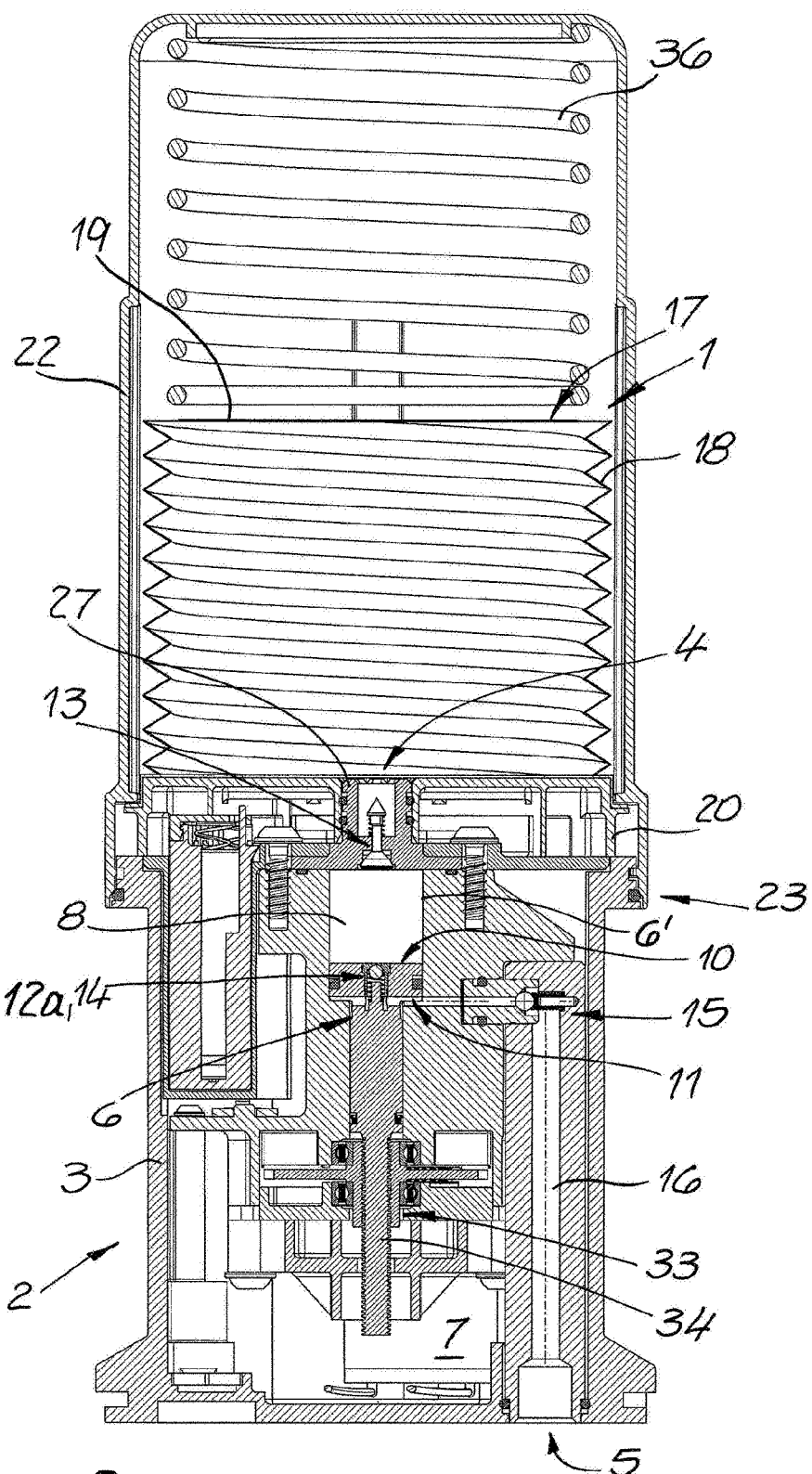
Figure 9:
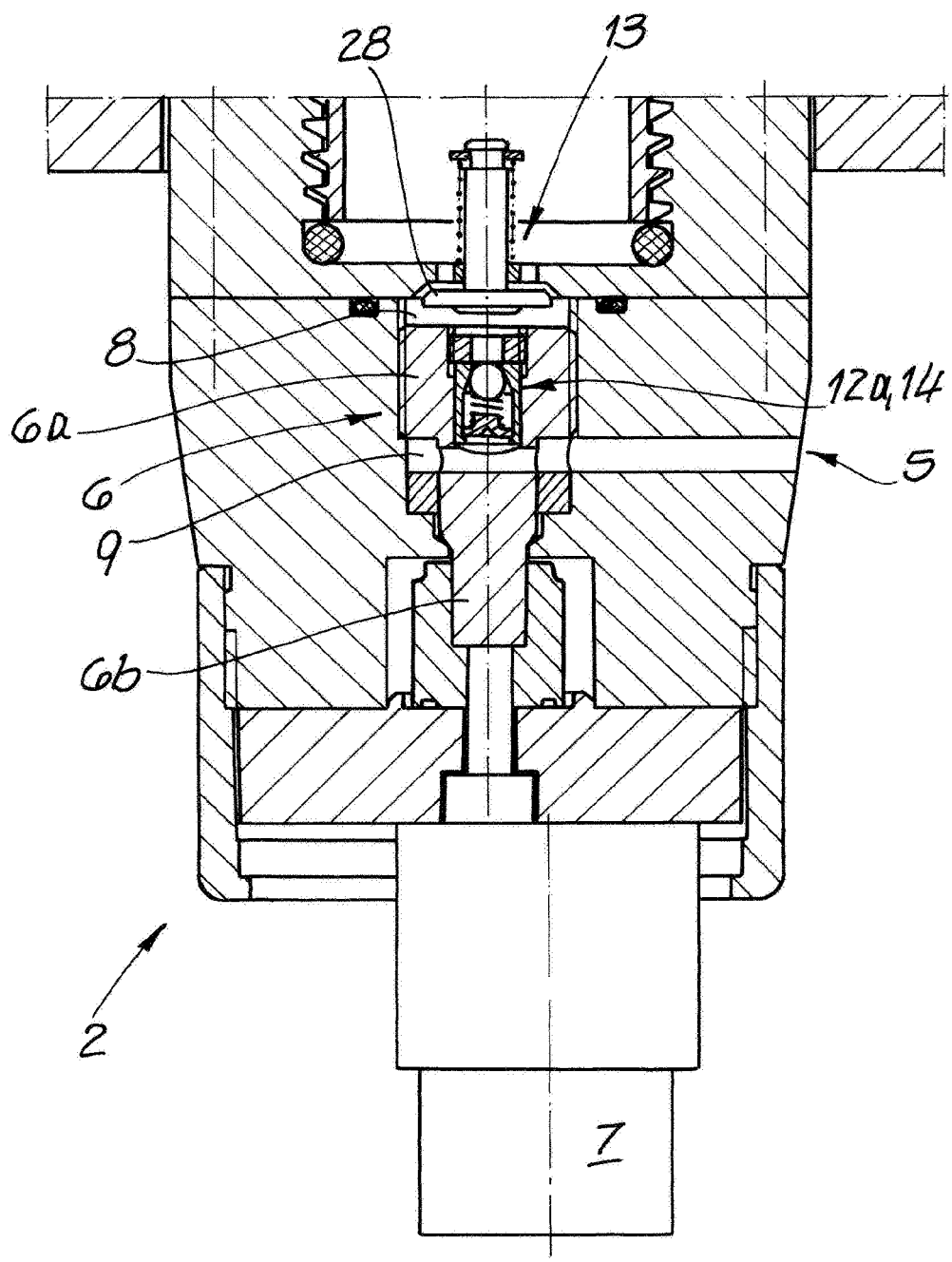
Figure 10:
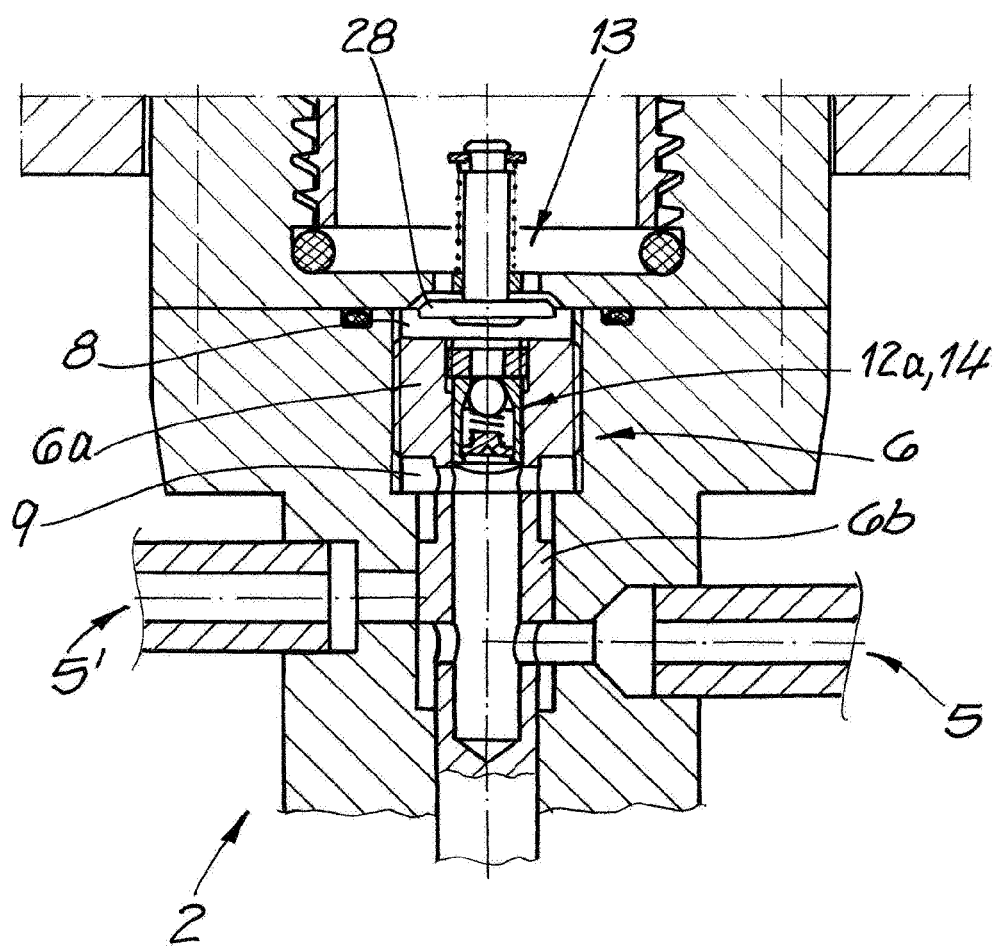
Figure 11A:
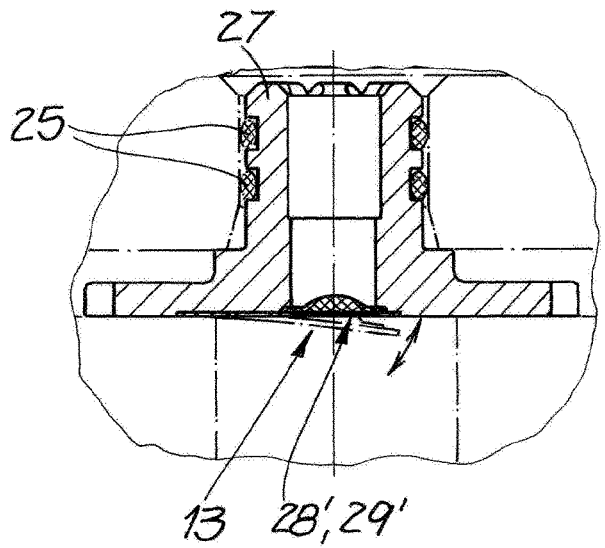
Figure 11B:
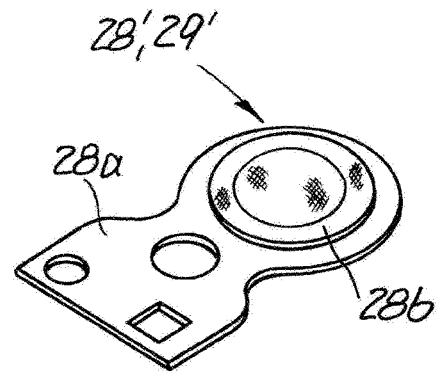
Figure 12:
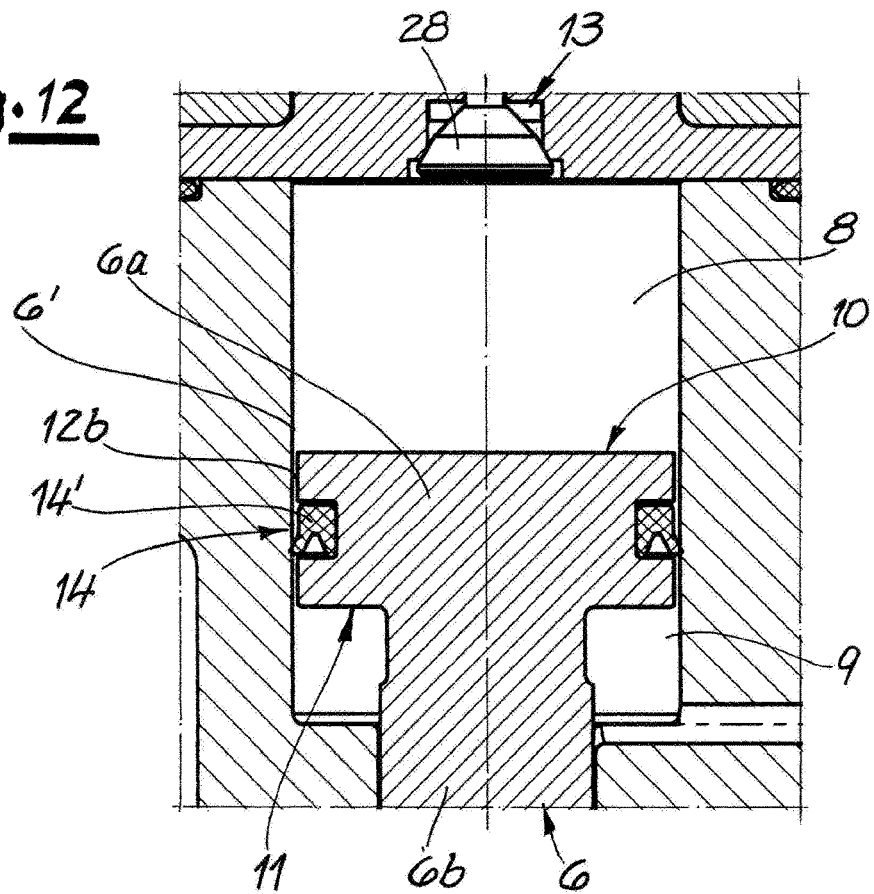

FIGS. 1A and 1B are vertical sections through a lubricant dispenser according to the invention in two different functional positions, FIGS. 2A, 2B, and 2C show an enlarged detail of the object according to the invention as seen in FIGS. 1A and 1B in three different functional positions, FIGS. 3 [and 3A] show[s] a reservoir of the lubricant dispenser according to FIGS. 1A and 1B in a first embodiment, FIGS. 4 [and 4A] show[s] a modified embodiment of the reservoir, FIG. 5 shows a pump of a lubricant dispenser according to FIG. 1A detached from the reservoir, FIG. 6 is a horizontal section through the a detail of FIG. 5, FIG. 7 shows a sectional detail of the threaded spindle shown in FIG. 5, FIG. 8 shows a modified embodiment of the invention according to FIG. 1B with an additional spring, FIG. 9 shows a modified embodiment of the pump of the invention, FIG. 10 shows a further embodiment of the pump according to the invention with two outlets in a schematically simplified detail view, FIG. 11A shows a modified embodiment of the first valve element for the pumps according to FIGS. 1 to 10, FIG. 11B is a perspective view of the valve element of FIG. 11A, FIG. 12 shows a modified embodiment of the second valve element for the pump according to FIGS. 1 to 10.

The figures show a lubricant dispenser and consequently a device for dispensing a lubricant that has, in its basic construction, on the one hand a reservoir 1 and, on the other hand, a pump 2 that can be detachably assembled to form a structural unit, that is, the pump 2 is connectable with its pump housing 3 to the reservoir 1 so that lubricant can be pulled out of the reservoir 1 by the pump 2. The pump 2 has the pump housing 3 with an upper inlet port 4 and a lower outlet port 5, and a plunger or piston 6 is movable axially in the pump housing 3. For this purpose, the piston 6 is driven by a drive 7 designed for example as an electric motor. The pump 2 is connected with its pump housing 3 directly to the reservoir 1, that is to say the pump housing 3 is joined together with the exchangeable reservoir 1 to form a structural unit. In order to convey the lubricant from the inlet port 4 to the outlet port 5, the piston 6 in the piston chamber 6' is cyclically raised and lowered by the drive 7, that is to say the piston 6 is raised in a first direction toward the reservoir 1 and, lowered in a second direction away from the reservoir 1.

The piston 6 is stepped and has an upper piston face 10 that downwardly delimits an upper (first) compartment 8 and a lower (second) piston face 11 that upwardly delimits a lower, second compartment 9. The lower piston face 11 is formed with a smaller effective surface area than the upper piston face 10, i.e. the lower piston face 11 is smaller than the upper piston face 10. The upper compartment 8 is connected to the inlet port 4 via a first valve 13 that is constructed as a one-way valve and that is biased by the force of a valve spring 29 into a closed rest position. A passage 12a is formed in the piston 6 as a conduit connecting the upper compartment 8 with the lower compartment 9 through a second valve 14. This second valve 14 is also a one-way valve with a valve spring 30. The lower compartment 9 is connected via an outlet passage 16 into the lower-end outlet port 5.

A comparison of FIGS. 1A and 1B shows that, when the piston 6 drops from its upper end position (FIG. 1A) it creates on the one hand a vacuum in the upper compartment 8 so the first valve 13 opens against the force of the valve spring 29 and lubricant is sucked out of the reservoir 1 into the upper compartment 8 and, on the other hand, the second valve 14 closes and lubricant flows out of the lower compartment 9 into the outlet passage 16 to the outlet port 5. While FIG. 1A shows the piston 6 in the upper end position, the piston 6 is in the lower end position in FIG. 1B. Raising the piston 6 from the functional position shown in FIG. 1 into the position shown in FIG. 1A on the one hand closes the first valve 13 and on the other hand opens the second valve 14 in the piston, so that at the same time lubricant flows out of the upper compartment 8 into the lower compartment 9 and lubricant from the lower compartment 9 is forced into the outlet passage 16 and thus to the outlet port 5.

Consequently, the pump housing 3 forms an internal cylinder chamber or compartment in which the piston 6 slides, this piston chamber or cylinder being subdivided by the piston into, on the one hand, the upper compartment 8 and, on the other hand, the lower compartment 9. According to the invention, lubricant is conveyed during each piston movement without an idle stroke or filling stroke.

The functional principle can also be seen in the enlarged views of FIGS. 2A, 2B and 2C. FIG. 2A shows the functional position according to FIG. 1A where the piston 6 is in the upper end position. Accordingly, FIG. 2B shows the functional position according to FIG. 1B where which the piston is in the lower end position. FIG. 2C shows a functional position in between, i.e. the piston 6 is in a functional position between the upper end position according to FIG. 2A and the lower end position of FIG. 2B.

The drive 7 is an electric motor that can be equipped with its own (integrated) transmission. The electric motor 7 operates via an (external) transmission or a threaded drive 33 on the piston 6, so that rotation of the electric motor is converted into axial movement. For this purpose, in the illustrated embodiment, the threaded drive 33 is a rotating component or wheel, in which a spindle or threaded rod 34 engages via an internal thread or internal teeth in the threaded drive 33. The piston 6 itself is rotationally fixed in the housing 3 or in the piston chamber 6' of the compartments 8 and 9. The motor 7 rotates the threaded drive 33. As a result, the spindle 34 raises or lowers and consequently raises and lowers the piston. The threaded drive 33 is rotatably supported in the housing by bearings 35.

As already mentioned, the piston 6 cannot rotate in the pump housing 3 or the cylinder chamber 8 and 9. Here, the stepped piston 6 has a first, upper piston part 6a and a second, lower piston part 6b connected on its lower side to the first piston part 6a. The upper end of the first piston part 6a forms the upper piston face 10. The lower end of the first piston part 6a forms the annular lower piston face 11. In the illustrated embodiment, the piston 6 has for its rotational fixing at least in some regions a cross-section that deviates from circular, an oval cross-section or an elliptical cross-section. In the illustrated embodiment, this relates to the first, upper piston part 6a (see FIG. 6). The upper compartment 8 and/or the lower compartment 9 are consequently not cylindrical, but they have an oval cross-section or an elongated cross-section or an elliptical cross-section, so that at the same time rotation is prevented. In contrast, the second, lower piston part 6b can be cylindrical.

A self-priming pump is particularly preferred in which the lubricant is withdrawn from the reservoir 1 without additional force being applied to the lubricant reservoir. This is achieved by minimizing the dead space volume, so that a perfect vacuum generation takes place when pumping. The piston 6 travels with its upper piston face 10 into the position shown in FIG. 1A. The valve element or plate 28, in the closed position, lies flush with an inner, upper end wall 26 of the pump housing 3, so the piston 6 lies in the upper end position with its upper piston face 10 against this upper end wall 26 and the valve element 28 lying flush with the upper end wall 26, so that only a minimum dead space can remain. As a result, as shown in FIGS. 1A, 1B and 2A to 2C, an exclusively self-priming action is achieved without additional pressure loading and consequently without an additional spring or an additional piston or the like in or on the reservoir. The reservoir 1 is preferably as a collapsing container, that is to say it collapses when emptying by the generation of negative pressure, so that, after emptying, the collapsed container remains as a waste product with a minimum residual volume.

For this purpose, FIGS. 1A, 1B and 2A to 2C show a first embodiment in which the reservoir 1 is or has a bellows 17. This bellows 17 has an accordion-like side wall 18 and a top wall 19. At the end of the side wall 18 opposite the top wall 19, there is a peripheral collar 19a that connects the bellows 17 to a rigid closure cover 20 (forming the container floor). Such a separate reservoir 1 with bellows 17 and closure cover 20 is shown in FIG. 3. The rigid closure cover 20 has a connection opening 21 that fits the inlet port 4 when mounted on the pump. After the reservoir 1 has been fitted atop the pump housing 3, the mechanical connection takes place in the sense of a fixing with the aid of a protective cap 22 connected to the pump housing 3 of the pump 2 via a screw or bayonet connection 23, specifically with interposition of the seals 24 and 25.

The embodiments of the side wall 18 of the bellows 17 shown in the figures are referred to as accordion-like. In principle, such a bellows can look like a stack of parallel plate springs with a concertina-like side wall, i.e. the individual pleats run parallel to one another. Such an embodiment is illustrated in FIG. 3 and also included by the term bellows or pleated bellows. In the embodiment in FIG. 1A and/or 8, the accordion-like side pleat is a single or multiple helix. In this way, the folds are more easily applied and, in particular, taller containers are prevented from buckling or collapsing laterally. In addition, emptying can thus be improved, since residual media are not so easily enclosed in folds, but slide downward in the spiral fold towards the outlet.

For a better understanding, FIG. 5 shows the pump 2 without the attached reservoir 1 and FIG. 3 shows the reservoir itself without the pump. FIGS. 1A, 1B and 2A to 2C finally show the complete lubricant dispenser with the reservoir 1 connected to the pump 2 by the protective cap 22.

It can also be seen in FIG. 5 that the housing 3 of the pump 2 has an upper mounting collar 27 in which the first valve 13 is integrated. This mounting collar 27 has the seal 25 on the outer surface and furthermore the seal 24 can be seen on the outer surface of the housing 3.

While FIG. 3 shows an embodiment of a reservoir 1 with bellows 17, FIG. 4 shows a modified embodiment of a reservoir 1 with a collapsing cup 17' that has a thin-walled jacket 18'. This collapsing cup 17' with thin-walled jacket 18' is in turn connected with a collar 19a to the rigid closure cover 20, for example via a welded or an adhesive connection. When emptying, this thin-walled cup 17' or its side wall 18' folds together so that a waste product with minimal residual volume is left.

FIG. 7 also shows that the conversion of rotation into a lifting movement can be realized with the aid of a special thread similar to a thread with trapezoidal-section teeth 34a of the threaded rod 34 with teeth 33a of the threaded drive 33 or its nut. Thus, the metal spindle 34 can have a reduced load-bearing portion, but for this purpose the plastic nut 33 has an increased load-bearing capacity. As a result, an increased force absorption is achieved with the same installation space. Such special threads are fundamentally known and seen in the prior art for other fields of application.

Furthermore, the drawing shows an embodiment in which, in addition to the first valve 13 and the second valve 14, there is a third valve 15, specifically in or at the outlet port or in the outlet passage 16. This valve is also a one-way valve and is a spring-loaded manner counter to the flow direction in its open position. This third valve 15 ensures that, if necessary, trapped air is conveyed much faster through the pump. The pressure required to suck in the medium builds up much more quickly. Manual venting, as is required in the prior art, instead does not take place. Consequently, air conveyed by the third valve 15 no longer interferes with the generation of the pump vacuum.

Even if the pump according to the invention is in principle particularly preferably realized in an aspirating manner and consequently can be operated without additional spring-force application of the reservoir, it is optionally possible to additionally act on the reservoir 1 with a spring 36. Such a variant is illustrated by way of example in FIG. 8. This is suitable for example for operation at particularly low temperatures or the delivery of highly viscous lubricants.

FIG. 9 shows a modified embodiment of a pump 2 where the piston 6 is rotatable in the compartment 8, 9, but is rotatable via a thread. Rotation of the drive 7 consequently leads to rotation of the piston and is converted directly into an axial movement of the piston via the thread coupling. Otherwise, in a modified embodiment, corresponding parts are represented by the same reference numerals, in particular the first valve 13 and the second valve 14.

In addition, a modified embodiment of a double-acting pump according to the invention with two outlet ports 5 and 5' is shown in FIG. 10.

The embodiments according to FIGS. 1 to 9 show a preferred embodiment with only a single outlet port 5, i.e. the lubricant dispenser is preferably designed for single-point lubrication. Alternatively, such a lubricant dispenser can also be used for multi-point lubrication, where for example the outlet port 5 is connected to an unillustrated manifold via which a multiplicity of lubrication points can be supplied through hoses or the like.

With reference to FIGS. 1 to 10, an embodiment having a first valve 13 has been described that, on the one hand, has a movable valve element 28 and, on the other hand, a separate valve spring 29 urging the movable valve element 28 into the closed position.

FIGS. 11A and 11B show a modified embodiment in which the first valve 13 has a resilient valve element 28' that at the same time forms the spring 29'. Consequently, this is a very simply constructed valve that essentially consists of the spring plate 28', 29' shown in FIG. 11, and in that, in its rest position, is biased by its own spring force toward the valve seat according to FIG. 11A. FIG. 11A shows the upper mounting collar 27 of the housing 3. FIG. 11B shows that the resilient valve element 28', which at the same time forms the spring 29', is a simple, rigid sheet metal part 28a provided with an elastomeric sealing surface 28b. The element is pressed with this elastomeric sealing surface 28b into the corresponding valve seat of the housing. In the invention shown in FIGS. 11A and 11B, the first valve 13 shown in FIG. 11B can also be realized in all embodiments according to FIGS. 1 to 10.

FIG. 12 shows a modified embodiment of the second valve 14 or a modified embodiment of the passage of the piston 6. Whereas in the embodiments according to FIGS. 1 to 10 a passage 12a is formed as a central passage 12b through the piston 6 or the upper piston part 6a, FIG. 12 shows a modified embodiment in which the passage 12b is formed by an annular space 12b that surrounds the piston 6 or the upper piston part 6a. This annular space 12b forms the passage and is consequently realized by appropriate dimensioning of the outer surface of the piston 6 or of the piston part 6a and of the inner surface of the piston chamber 6'. When conveying, the medium consequently does not flow through a central opening of the piston, but along the outer surface of the piston 6 through the annular space 12b. In this case, the second valve 14 is formed by a resilient seal 14' that has a V-shaped cross-section seal or V-seal 14', specifically in such a way that the medium can flow past on the outside of the piston in a flow direction, but the V-shaped seal has a blocking effect in the opposite direction. This embodiment according to FIG. 12 can be used in the described embodiments according to FIGS. 1 to 10 and 11A, 11B and consequently can be combined with the options described in connection with these figures.

The invention claimed is:

1. A lubricant dispenser comprising a reservoir filled with lubricant, and a pump connected or connectable to the reservoir and that moves lubricant out of the reservoir, the pump comprising
   a pump housing with an inlet port and an outlet port,
   a piston movable axially in the pump housing and
   a drive actuating the piston,
the pump being connectable or connected to the reservoir through the pump housing, the piston being cyclically raised and lowered in a piston chamber by the drive in order to convey the lubricant from the inlet port to the outlet port, wherein
   the piston is stepped with a upper piston face that delimits an upper compartment, and a lower piston face that delimits a lower compartment and that is smaller than the upper piston face,
   the upper compartment is connected to the inlet port via a first valve that is or can be actuated into a closed rest position,
   a piston passage in or on the piston connects the upper compartment to the lower compartment via a second valve, and
   the lower compartment is connected to the outlet port via an outlet passage such that
      lowering the piston on the one hand creates a negative pressure in the upper compartment opens the first valve and sucks lubricant out of the reservoir into the upper compartment and, on the other hand, closes the second valve and forces lubricant out of the lower compartment into the outlet passage, and
      raising the piston on the one hand closes the first valve and on the other hand opens the second valve in the piston such that lubricant flows out of the upper compartment into the lower compartment and is forced out of the lower compartment into the outlet passage.

2. The lubricant dispenser according to claim 1, wherein the first valve is urged by a spring force into the closed rest position and, when the piston is lowered, is opened against the spring force by the negative pressure in the upper compartment.

3. The lubricant dispenser according to claim 2, wherein the first valve has a movable valve element and a separate valve spring acting on the valve element.

4. The lubricant dispenser according to claim 2, wherein the first valve has or is a resilient valve element that at the same time is formed as a valve spring.

5. The lubricant dispenser according to claim 1, wherein the piston in the upper end position engages with its upper piston face against the first valve.

6. The lubricant dispenser according to claim 1, wherein the piston passage is integrated into the piston, the valve having a movably guided valve element actuated by a valve spring.

7. The lubricant dispenser according to claim 1, wherein the piston passage is formed by an annular space surrounding the piston, and the second valve has or is formed by a seal on the piston.

8. The lubricant dispenser according to claim 1, wherein the lubricant is conveyed exclusively by suction by the pump without additional application of pressure to the reservoir.

9. The lubricant dispenser according to claim 1, wherein the reservoir is a container that collapses when emptying or has a collapsing liner.

10. The lubricant dispenser according to claim 9, wherein the reservoir is a collapsible cup with a cylindrical, flexible casing or has such a collapsing cup, or in that the reservoir is a bellows with an accordion-like container casing or has such a bellows.

11. The lubricant dispenser according to claim 1, wherein the drive is an electromotive rotary drive with a reversible direction of rotation.

12. The lubricant dispenser according to claim 1, wherein the drive is connected to the piston via a gear mechanism that converts rotation of the drive into straight-line or axial movement of the piston.

13. The lubricant dispenser according to claim 1, wherein the upper piston face and the lower piston face are sized relative to one another in such a way that during the raising and lowering of the piston the same volume is always conveyed out of the lower compartment into the outlet passage or to the outlet port.

14. The lubricant dispenser according to claim 1, wherein the piston is not rotatable in the pump housing.

15. The lubricant dispenser according to claim 1, wherein the stepped piston has an upper first part and a second piston part connected on the underside of the first piston part, an upper side of the first piston part forming the upper piston face and the underside of the first piston part forming the lower piston face that is annular.

16. The lubricant dispenser according to claim 1, wherein the piston has, at least in regions a cross-section that deviates from circular.

17. The lubricant dispenser according to claim 1, wherein a third valve is in or on the outlet port or in the outlet passage and is biased closed toward the lower compartment.

18. A pump for a lubricant dispenser, the pump comprising a pump housing having an inlet port and an outlet port, a piston movable axially in the pump housing, and a drive actuating the piston, and a drive cyclically raising and lowering the piston for conveying the lubricant from the inlet port to the outlet port, wherein the piston is stepped with an upper piston face that delimits an upper compartment and a lower piston face that delimits a lower compartment and is smaller than the upper piston face, the upper compartment is connected to the inlet port via a first valve biased into a closed rest position, a piston passage in or on the piston connects the upper compartment to the lower compartment through a second valve the lower compartment is connected to the outlet port via an outlet passage such that, on the one hand, by formation of a negative pressure in the upper compartment, the first valve opens, for example against spring force, and lubricant is sucked out of a reservoir into the upper compartment and, on the other hand, the second valve closes and lubricant is forced out of the lower compartment into the outlet passage while the first valve is closed and the second valve in the piston open such that lubricant flows out of the upper compartment into the lower compartment and lubricant from the lower compartment is forced into the outlet passage.

19. A reservoir for a lubricant dispenser, the reservoir being connectable to a pump of the lubricant dispenser, wherein the reservoir is a cylindrical cup casing that collapses when emptying, or has a collapsing liner.

20. The reservoir according to claim 19, wherein the flexible, cylindrical cup casing is connected to a rigid closure cover that has a connection opening for escape of the lubricant, wherein the rigid closure cover is designed for the connection of the reservoir to a pump.

* * * * *